(12) United States Patent
Jaeger

(10) Patent No.: US 10,144,104 B2
(45) Date of Patent: Dec. 4, 2018

(54) METHOD FOR PRODUCING AN AXIALLY EXTENDING TOOL TIP AND TOOL TIP

(71) Applicant: Kennametal Inc., Latrobe, PA (US)

(72) Inventor: Horst Manfred Jaeger, Nuremberg (DE)

(73) Assignee: KENNAMETAL INC., Latrobe, PA (US)

( * ) Notice: Subject to any disclaimer, the term of this patent is extended or adjusted under 35 U.S.C. 154(b) by 203 days.

(21) Appl. No.: 14/768,362

(22) PCT Filed: Feb. 14, 2014

(86) PCT No.: PCT/US2014/016429
§ 371 (c)(1),
(2) Date: Aug. 17, 2015

(87) PCT Pub. No.: WO2014/127210
PCT Pub. Date: Aug. 21, 2014

(65) Prior Publication Data
US 2015/0375356 A1    Dec. 31, 2015

(30) Foreign Application Priority Data

Feb. 18, 2013 (DE) .................. 10 2013 202 578

(51) Int. Cl.
*B21K 5/04* (2006.01)
*B24B 19/04* (2006.01)
*B23B 51/02* (2006.01)

(52) U.S. Cl.
CPC ............. *B24B 19/04* (2013.01); *B23B 51/02* (2013.01); *B23B 2251/446* (2013.01)

(58) Field of Classification Search
CPC ...... B24B 9/04; B23B 51/02; B23B 2251/446
(Continued)

(56) References Cited

U.S. PATENT DOCUMENTS 465,392 A * 12/1891 Shippee .................. B23B 51/02
                                                           408/230
700,892 A *  5/1902 Blackburn et al. ...... B23G 5/06
                                                           408/220

(Continued)

FOREIGN PATENT DOCUMENTS

CN    1261298 A    7/2000
CN    1756610 A    4/2006
(Continued)

OTHER PUBLICATIONS

International Search Report for corresponding PCT application PCT/US2014/016429, dated May 20, 2014, 3 pages.
(Continued)

*Primary Examiner* — Ghassem Alie
*Assistant Examiner* — Bharat C Patel
(74) *Attorney, Agent, or Firm* — Matthew S. Bedsole

(57) ABSTRACT

In order, in a drill tip (2) which is provided particularly for a modular drilling tool, to generate a ridge (18) with supporting chamfers (26, 28) in a simple way, a non-round grinding method is provided, in which, proceeding from a starting rotary position (30) which corresponds to a cutting corner position, the radius is first reduced and is subsequently increased again to form the supporting chamfer (28). There is therefore no need for a separate grinding step to form the supporting chamfers (26, 28). The supporting chamfers (26, 28) preferably extend parallel to the longitudinal mid-axis (22) in the axial direction (24) and intersect coiled chucking grooves (26).

12 Claims, 2 Drawing Sheets

(58) Field of Classification Search
USPC .......................................................... 76/108.6
See application file for complete search history.

(56) References Cited

U.S. PATENT DOCUMENTS

| | | | | |
|---|---|---|---|---|
| 4,602,900 | A * | 7/1986 | Arpaio, Jr. | A61C 3/02 408/230 |
| 4,826,368 | A * | 5/1989 | Tikal | B23B 51/02 408/225 |
| 5,486,075 | A * | 1/1996 | Nakamura | B23B 51/02 408/224 |
| 6,663,326 | B1 | 12/2003 | Hiroyasu | |
| 6,929,434 | B2 * | 8/2005 | Prokop | B23B 51/00 408/224 |
| 7,559,383 | B2 * | 7/2009 | Koch | B23B 51/02 175/415 |
| 7,717,654 | B2 * | 5/2010 | Cirino | B23B 51/02 408/226 |
| 8,105,001 | B2 * | 1/2012 | Krenzer | B23B 51/02 408/227 |
| 8,834,080 | B2 * | 9/2014 | Kauper | B23B 51/02 408/224 |
| 8,845,244 | B2 * | 9/2014 | Krenzer | B23B 51/02 408/227 |
| 2004/0124016 | A1 | 7/2004 | Nuzzi et al. | |
| 2011/0024193 | A1 | 2/2011 | Shamburger et al. | |
| 2011/0097976 | A1 * | 4/2011 | Muhlfriedel | B23B 51/02 451/48 |
| 2011/0170973 | A1 | 7/2011 | Von Puttkamer | |
| 2012/0009034 | A1 * | 1/2012 | Mack | B23B 51/02 408/226 |
| 2012/0087753 | A1 | 4/2012 | Kataoka et al. | |

FOREIGN PATENT DOCUMENTS

| | | | |
|---|---|---|---|
| CN | 102348523 A | 2/2012 | |
| CN | 102741001 A | 10/2012 | |
| DE | 248382 C | 9/1910 | |
| DE | 248382 | 6/1912 | |
| DE | 102010026271 | 1/2012 | |
| FR | 2623114 A2 * | 5/1989 | ............... B23G 5/06 |
| JP | 55090213 A * | 7/1980 | |
| JP | 06179121 A * | 6/1994 | |
| RU | 1799699 A2 * | 3/1993 | |
| SU | 43536 A1 * | 6/1935 | |
| SU | 480986 A1 * | 8/1975 | |
| SU | 541606 A1 * | 1/1977 | |
| WO | 2014127210 | 8/2014 | |

OTHER PUBLICATIONS

Apr. 12, 2017 Second Office Action K-04258-CN-PCT.
Sep. 22, 2017 Third Office Action K-04258-CN-PCT.

\* cited by examiner

METHOD FOR PRODUCING AN AXIALLY EXTENDING TOOL TIP AND TOOL TIP

CROSS REFERENCE TO PRIORITY APPLCIATIONS

This application is a U.S. National Phase of PCT/US2014/016429, filed Feb. 14, 2014, which claims the benefit of German Application No. 10 2013 202 578.5, filed Feb. 18, 2013, each of which are incorporated by reference in their entireties.

The invention relates to a method for producing an axially extending tool tip, in particular drill tip or else milling cutter tip, which has a basic body with chucking grooves introduced therein and with a respective ridge between the chucking grooves. The invention relates, furthermore, to a tool tip produced, in particular, according to this method.

BACKGROUND OF THE INVENTION

The production of drills, for example full-carbide drills, or else the production of drill tips for modular drilling tools, in which the drill tips can be inserted as reversibly exchangeable drill tips into a carrier shank, is usually carried out in several grinding steps, starting from a round blank which is ground to a cylindrical nominal dimension and into which, moreover, spirally coiled chucking grooves are often ground.

In many applications, for improved guidance of the drill in a drillhole made, at least one supporting chamfer is arranged on the drill ridge. Conventionally, after a secondary cutting edge running along the chucking groove, a first supporting chamfer is formed, and a further supporting chamfer is formed at a distance from the latter, for example at the rear end of the drill ridge. A twist drill having, for example, three supporting chamfers can be gathered, for example, from US 465,392 A. In order to generate the supporting chamfers, the drill ridge is ground in a separate grinding step, so that the supporting chamfers are left standing.

In particular in modular drilling tools, this is highly complicated because of the very short axial length of the reversibly exchangeable drill tip which often lies only in the range of once to twice the drill nominal diameter.

OBJECT OF THE INVENTION

Proceeding from this, the object on which the invention is based is to specify a simplified method for generating a grooved tool tip with at least one supporting chamfer on the ridge and also a tool tip produced accordingly.

Solution for Achieving the Object

The object is achieved, according to the invention, by means of a method having the features of claim 1. According to these, to produce an axially extending tool tip which has a basic body with chucking grooves introduced therein and with a respective ridge between the chucking grooves, in a first method step, a blank is ground, non-round, specifically in such a way that, at each ridge, the radius of the blank first decreases from a starting rotary position corresponding to a cutting corner position and subsequently increases again to form a supporting chamfer.

The tool tip is designed, in particular, as a drill tip or else as a milling cutter tip. The invention and also developments are explained further below with reference to a drill tip.

Starting rotary position is understood in this context to mean a circumferential position on the blank in which the basic body is ground to the drilling nominal diameter. This starting rotary position corresponds in this case to the rotary position in which a cutting corner is formed, that is to say a rotary position in which a major cutting edge formed on the end face of the drill tip merges at the radially outer end into a minor cutting edge.

Instead of a separate grinding step for generating the supporting chamfer, the latter is therefore formed directly when the blank is ground to the drilling nominal diameter. Consequently, instead of cylindrical round grinding, non-round grinding takes place, as seen in cross section to the axial direction. One advantage of this grinding method is also to be seen in that the drill ridge, as seen in cross section, is formed overall so as to be cant-free. The drill ridge therefore runs along a homogeneously continuous circumferential line. Owing to the single-stage grinding step for grinding the drill to nominal diameter, and at the same time in order to introduce the supporting chamfer, the basic body is therefore ground with the largest radius in the starting rotary position. Proceeding from this, the radius is first reduced in the circumferential direction continuously and smoothly until, in order to form the supporting chamfer, it increases again up to a supporting chamfer radius.

Expediently, there is additionally provision whereby the radius decreases again in the circumferential direction after the supporting chamfer, until the ridge finally runs out into the following chucking groove.

In an expedient development, the chucking grooves are coiled and the non-round cross-sectional geometry generated in the first method step is continued in the axial direction with lower twist and, in particular, without twist. As a result of this measure, particularly in the configuration without twist, the largest nominal radius is therefore always formed in the same rotary position which corresponds exactly to the cutting corner position. As a result, overall, the production method is kept simple. In general, the chucking grooves and the supporting chamfer have different twist angles. In particular, the supporting chamfer extends in the axial direction parallel to a longitudinal mid-axis of the drill tip. This configuration is based on the notion that, particularly in drill tips for modular drilling tools, complex grinding geometries are critical because of the short axial length and associated chucking problems. Furthermore, this configuration is based on the notion that, for good guidance of the drill tip in a drillhole made, in particular, those regions of the supporting chamfers which are near the end faces are of critical importance, whereas, further along axially, the supporting chamfers are less important for reliable concentric running. Consequently, as a result of the configuration of the supporting chamfers without twist, coiled chucking grooves being used at the same time, the relative position of supporting chamfers changes in relation to their position on the drill ridge between two successive chucking grooves as a function of the axial position.

In an expedient refinement, the first method step is carried out in such a way that, after the cutting corner position, a guide chamfer is formed as a further supporting chamfer, the radius of the blank is subsequently reduced and finally increased again to form the supporting chamfer. The guide chamfer directly adjacent to the cutting corner position has in this case, at least virtually, the nominal radius, whereas the supporting chamfer has, by contrast, a smaller radius.

Particularly in the refinement with the coiled chucking grooves and, at the same time, the two supporting chamfers extending in the axial direction, the result of this, in a preferred development, is that the guide chamfer runs out into the intersecting coiled chucking groove. The guide chamfer is therefore formed only in the region of the actual cutting corner over a short axial distance.

To generate the non-round geometry, the blank is preferably rotated about its longitudinal mid-axis, and the grinding wheel is fed perpendicularly to the axial direction in relation to the blank according to the desired cross-sectional contour, so that, during a respective revolution of the blank, the distance between the grinding wheel and the blank varies according to the desired cross-sectional contour. The grinding wheel is therefore fed perpendicularly to the longitudinal mid-axis. This preferably takes place in such a way that the radial distance between the grinding wheel and the longitudinal mid-axis of the blank always assumes the same value in the respective angular position (rotary positions of the blank), independently of the axial position, so that the entire non-round cross-sectional contour is thus continued, non-twisted, in the axial direction.

To generate the chucking grooves, a second grinding method step is provided. "First" and "second" method step indicate merely that two separate grinding steps are involved. There can be any time sequence. Consequently, the chucking grooves may be ground first and then the non-round cross-sectional geometry. Preferably, however, the non-round cross-sectional geometry is ground first in the first method step, and subsequently the chucking grooves are ground.

Since a separate grinding step for generating the supporting chamfers is dispensed with owing to the non-round grinding, the two method steps are therefore used exclusively to form the chucking grooves and the supporting chamfers. In addition, finishing operations, such as, for example, the grinding of the face geometry or else of the minor cutting edge, can also take place. However, there are no further machining steps provided for generating the supporting chamfer on the ridge. The face geometry is additionally ground in a way known per se. In this case, major cutting edges are ground which are connected to one another conventionally via a chisel edge. A taper can also be ground in addition in the region of the chisel edge.

In the non-round grinding, the radius at the supporting chamfer is expediently designed to be about 0.01 mm to about 0.02 mm smaller than the radius at the cutting corner position and therefore also at the guide chamfer. A desired radial passage between the minor cutting edge or guide chamfer and supporting chamfer is thereby achieved.

Furthermore, in an expedient refinement, there is provision whereby a conical diminution is superposed in the axial direction upon the non-round cross-sectional geometry, that is to say the radii of the guide chamfer and supporting chamfer diminish in the axial direction. A passage which is desirable in the axial direction is thereby likewise generated.

Expediently, the drill tip is an exchangeable drill tip for a modular drilling tool. The geometry described here and the grinding method are adapted to a drill tip of this type. In particular, the configuration with the axially running supporting chamfer and with coiled chucking grooves is non-critical in the case of drill tips of this type, since these are exchanged when they become worn. In solid drills without an exchangeable drill tip, the cutting region is conventionally reground, which, in the present case, would have an adverse effect because of the axially running supporting chamfer with a coiled chucking groove.

Furthermore, this object is achieved, according to the invention, by means of a tool tip, preferably a drill tip, in particular produced by means of a method according to such a claim. A tool tip of this type preferably has a basic body with coiled chucking grooves and with a ridge arranged between them, a supporting chamfer being formed on a respective ridge and running axially parallel to the axial direction.

In an expedient design, in general, the non-round cross-sectional geometry is continued axially parallel in the axial direction, so that the coiling of the chucking grooves reduces the distance of a cant, in particular the minor cutting edge, delimiting the chucking groove from the longitudinal mid-axis, starting from a cutting corner. As a result of the coiling of the chucking groove, this therefore intercepts the non-round cross-sectional geometry with the varying radial distances from the longitudinal mid-axis at different radial distances, with the result that the reduction in the distance is set at the cant. A conical diminution is preferably superposed additionally in the axial direction upon this reduction.

The individual circumferential portions of the non-round geometry in this case preferably form cylindrical subsections, at least run in a horizontal sectional plane along a circularly arcuate line. This applies particularly to the form of the guide chamfer. Furthermore, however, a run along a circularly arcuate line is also provided for intermediate portions between the two supporting chamfers. In the case of a conical diminution in the axial direction, the corresponding circumferential portions are not formed cylindrically, but instead in the shape of a cone envelope.

DESCRIPTION OF THE FIGURES

A design variant of the invention is explained in more detail below by means of the figures of which, in each case in simplified illustrations.

DESCRIPTION OF THE EXEMPLARY EMBODIMENT

Figure 1:
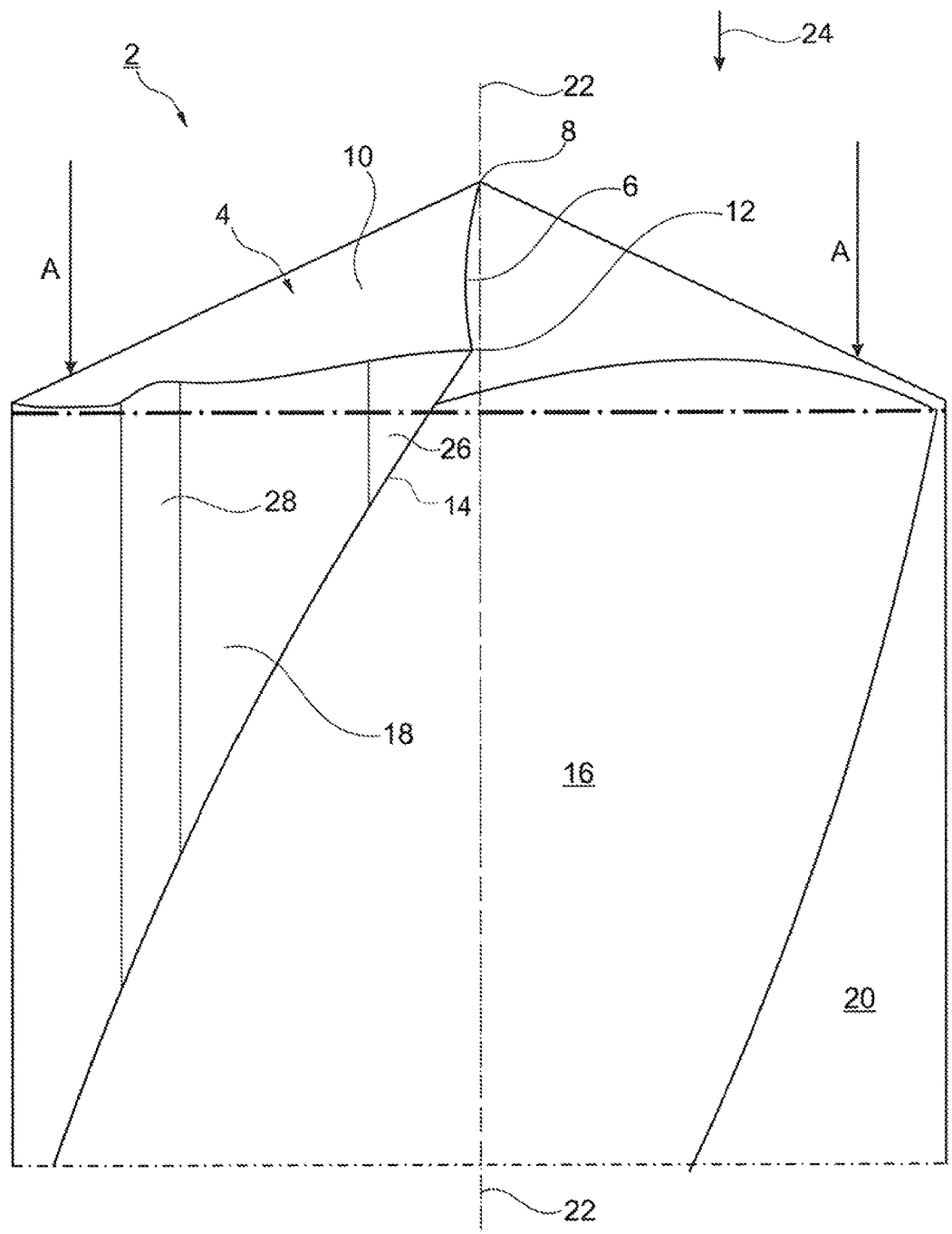
FIG. 1 shows, in the form of a detail, a side view of a drill tip.

The drill tip 2 illustrated in the figures is designed, in particular, as a reversibly exchangeable drill tip for use in a modular drilling tool. For this purpose, it has a coupling point, not illustrated in any more detail here, by means of which it can be inserted in a reversibly exchangeable manner into a carrier tool. The drill tip 2 extends along a longitudinal mid-axis 22 in the axial direction 24.

The drill tip 2 has, in general, a drill face 4 with major cutting edges 6, a centering tip 8 and major flanks 10. The drill face 4 is formed in a way known per se, for example in the manner of a four-flank or cone envelope grinding, etc. The major cutting edges 6 are conventionally connected to one another via a chisel edge across the centering tip 8. The major cutting edges 6 extend to the outer circumference as far as a cutting corner 12 which conventionally has adjoining it in the axial direction 24 a minor cutting edge 14 which runs along a chucking groove 16. A ridge 18 is in each case formed circumferentially between two successive chucking grooves 16. The chucking grooves 16 are therefore generally introduced into a basic body 20. In the exemplary embodiment, they run in a coiled manner, therefore have a twist angle in relation to the longitudinal mid-axis 22.

A first supporting chamfer designated as a guide chamfer 26 is formed adjacently to the cutting corner 12 on the circumference of the drill tip 2 in the region of the ridge 18. At a distance from said supporting chamfer in the circumferential direction or direction of rotation, a further supporting chamfer 28 is formed. As may be gathered from FIG. 1, the two supporting chamfers 26, 28 run axially parallel to the longitudinal mid-axis 22 and both intersect the minor cutting edge 14 which is formed by a cant in relation to the respective cutting groove 16.

Figure 2:
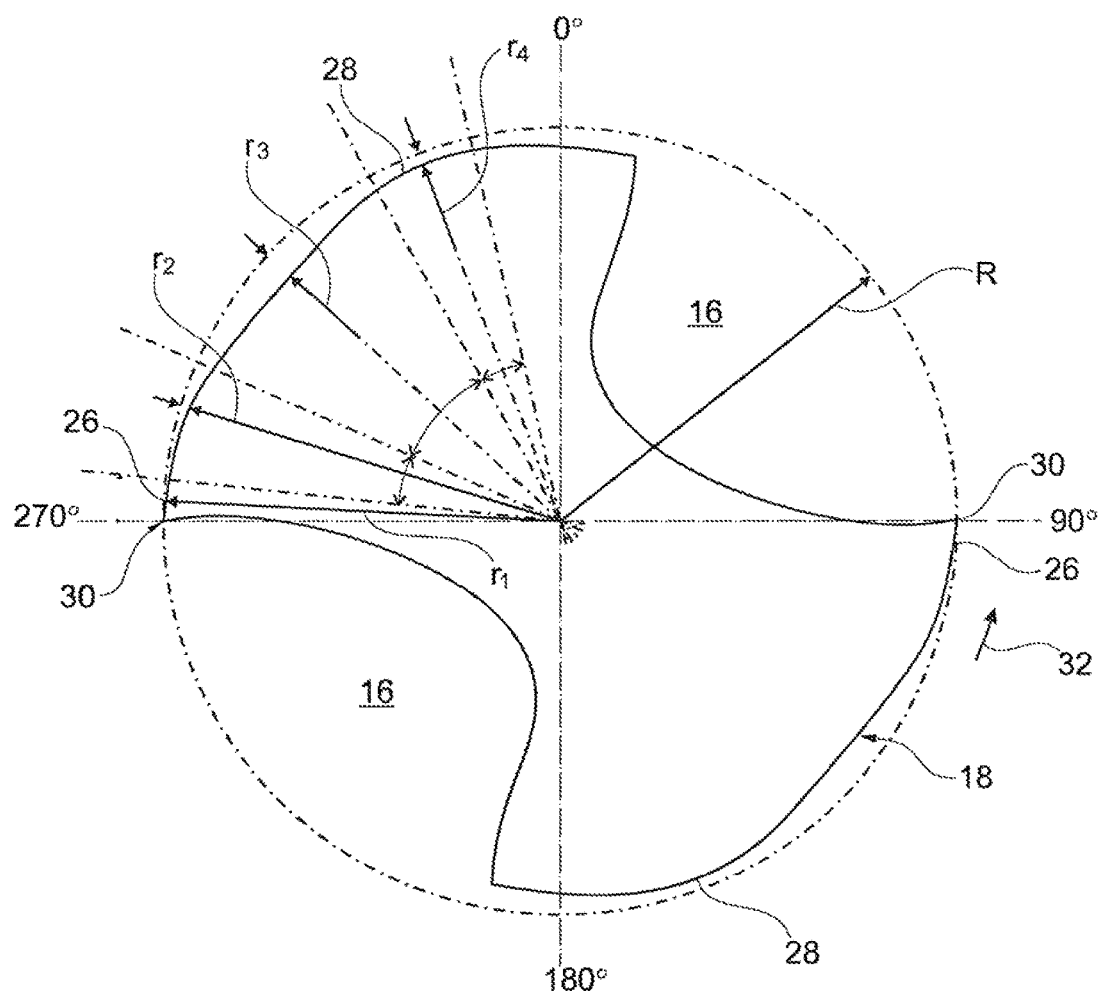
FIG. 2 shows a sectional view along the sectional plane A-A in FIG. 1.

As may be gathered particularly from the sectional illustration of FIG. 2, the drill tip 2 has overall a non-round cross-sectional geometry. Proceeding from a starting rotary position 30, which corresponds to a rotary position of the drill tip 2 in the position of the cutting corner 12, the respective ridge 18 is ground so as to deviate from a circular contour. This circular contour is illustrated in FIG. 2 by a dashed and dotted line which at the same time represents a drill nominal radius R. The drill tip 2 is ground to this nominal radius at the cutting corner 12.

After the starting rotary position 30, there first follows a subsection which forms the guide chamfer 26 and which extends over a few degrees. In this region of the guide chamfer 26, the circumferential line preferably runs along a radius r1 which is slightly smaller than the nominal radius R, so that a certain clearance is formed. This first subsection is followed by a second subsection with a further-reduced radius r2 (distance from the longitudinal mid-axis), so that the passage, that is to say the distance between the actual circumferential line and the nominal radius R, increases. In a subsequent circumferential portion, the circumferential line runs further on approximately rectilinearly with a radius r3, before it then rises again continuously to a radius r4 which forms the supporting radius of the rear supporting chamfer 28. The radii r1-r4 are understood in general to mean the distances from the longitudinal mid-axis 22. The corresponding subsections may, but do not necessarily have to, run along a circularly arcuate line having the respective radius r1-r4. The two supporting chamfers 26, 28 are in this case at an angle of about 70° distant from one another. After the rear supporting chamfer, the ridge also runs further on over an angular distance of, for example, 10° to 30°, the radius being reduced again here.

The cross-sectional geometry, overall, is rotationally symmetrical by 1/N×360° with respect to rotation about the longitudinal mid-axis 22, N being the number of major cutting edges. Minor deviations from this exact rotational symmetry for the purpose of generating slight asymmetry (deviation<5% from symmetry) in order to avoid rattling problems are possible.

The individual portions of the ridge 18 merge continuously, preferably continuously homogeneously, cant-free, one into the other. To approach such a continuously homogeneous run, a plurality of flanks may also be contiguous to one another. The radius r4 at the rear supporting chamfer 28 is about 0.1 mm to 0.2 mm smaller than the nominal radius R.

To form the drill tip 2, in particular the non-round cross-sectional geometry illustrated in FIG. 2, the drill tip 2 is ground in a grinding method by means of a grinding wheel, not illustrated in any more detail here. For this purpose, the drill tip 2 rotates about the longitudinal mid-axis 22 in the direction of rotation 32. During this rotation, the grinding wheel is fed perpendicularly to the longitudinal mid-axis 22 in the radial direction according to the circumferential contour illustrated in FIG. 2. In this case, in the same angular positions, the grinding wheel in each case assumes the same radial distance from the longitudinal mid-axis 22. This means that, in the cutting corner positions (corresponding to the positions at 90° and 270° in FIG. 2), the grinding wheel is in each case located in the position of the nominal radius R and, starting from this, during further rotation of the drill tip 2 in relation to the longitudinal mid-axis 22, is first fed and is subsequently retracted again in order to form the desired contour. After a 180° revolution (in the case of two major cutting edges 6) of the drill tip 2, the grinding wheel is in each case in exactly the same radial feed position again. As a result, the circumferential contour illustrated in FIG. 2 is continued in the axial direction 24 in each case without twist, so that the two chamfers 26, 28 in each case intersect the minor cutting edge 14.

The invention claimed is:

1. A method for producing a tool tip which extends along a longitudinal mid-axis in the axial direction and which has a body with a plurality of chucking grooves introduced therein and with a respective ridge extending between adjacent chucking grooves, the method comprising:
    in a first grinding step, grinding a blank to generate a non-round cross-sectional geometry, such that at each ridge, proceeding from a starting rotary position corresponding to a cutting corner adjacent a first chucking groove, a radius of the blank decreases to form a guide chamfer, then becomes rectilinear, then increases again to form a supporting chamfer, and then decreases again from the supporting chamfer until reaching a second chucking groove,
    wherein the starting rotary position of the blank after the first grinding step has a nominal radius (R) defined as a radial distance from the longitudinal mid-axis to the starting rotary position;
    wherein the supporting chamfer has a chamfer radius (r4) defined as a radial distance from the longitudinal mid-axis to the supporting chamfer; and
    wherein the chamfer radius (r4) is smaller than the nominal radius (R).

2. The method according to claim 1, wherein the chucking grooves are coiled; and wherein the supporting chamfer generated by grinding continues in the axial direction with lower twist than that of the chucking grooves.

3. The method according to claim 1, wherein, to generate the non-round cross-sectional geometry, the blank is rotated about the longitudinal mid-axis and the grinding wheel is fed perpendicularly to the axial direction in relation to the blank according to a desired cross-sectional contour, so that, during a revolution of the blank, a distance between the grinding wheel and the blank varies according to the desired cross-sectional contour.

4. The method according to claim 1, wherein, in a second grinding step, the chucking grooves are ground; and wherein the first and the second grinding steps are used exclusively to form the chucking grooves and the first and second supporting chamfers on the respective ridge.

5. The method according to claim 1, wherein the second chamfer radius (r4) at the supporting chamfer is about 0.01 to 0.02 mm smaller than the nominal radius (R) at the cutting corner position.

6. The method according to claim 1, wherein the basic body is designed to diminish conically in the axial direction.

7. The method according to claim 1, wherein the tool tip is an exchangeable tool tip for a modular drilling tool.

8. A tool tip produced by means of a method according to claim 1.

9. The tool tip according to claim 8, wherein the first and second supporting chamfers runs axially parallel to the axial direction.

10. The tool tip according to claim 9, wherein the non-round cross-sectional geometry is continued axially parallel in the axial direction, so that the coiling of the chucking grooves reduces the distance of a cant delimiting the chucking groove from the longitudinal mid-axis, starting from a cutting corner.

11. The method of claim 2, wherein the non-round cross-sectional geometry generated in the first grinding step is continued in the axial direction without twist.

12. The method of claim 1, wherein the guide chamfer and the supporting chamfer are formed at an angle of about 70 degrees apart from each other.

* * * * *